Aug. 7, 1923.

G. L. MILLER

ROOT CANAL POINT

Filed Aug. 10, 1921

1,463,963

Inventor.
George L. Miller,
by Rippey & Kingsland,
His Attorneys.

Patented Aug. 7, 1923.

1,463,963

UNITED STATES PATENT OFFICE.

GEORGE L. MILLER, OF ST. LOUIS, MISSOURI.

ROOT-CANAL POINT.

Application filed August 10, 1921. Serial No. 491,069.

*To all whom it may concern:*

Be it known that I, GEORGE L. MILLER, a citizen of the United States, and a resident of St. Louis, Missouri, have invented a new and useful Root-Canal Point, of which the following is a specification.

This invention relates to root canal points.

In the use of canal points, composed wholly of gutta-percha, paraffine or other plastic material, it frequently occurs that the pointed ends of the points are turned or bent during the operation of placing canal points in the roots of the teeth. When the pointed ends of the canal points become bent or turned, the canal points do not properly fit within the roots of the teeth, so that the desired beneficial results are not obtained.

An object of the present invention is to provide an improved root canal point that is wholly free from the objections mentioned.

Another object of the invention is to provide an improved root canal point, comprising a body of gutta-percha, paraffine or other appropriate plastic material, having a small and smooth metallic wire embedded therein and forming a core to prevent the extremity of the canal point from being bent or turned back upon itself when the canal point is inserted in a root canal, and which permits plastic material to be pressed to position to fill the root canal.

Figure 1:
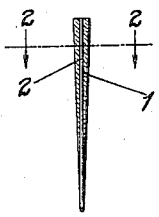

With the foregoing and other objects and advantages to be obtained, all of which will be apparent from the following description, I have embodied my invention in a satisfactory form, as shown in the accompanying drawing, in which, Fig. 1 is an enlarged longitudinal sectional view of a root canal point constructed in accordance with the present description.

Figure 2:
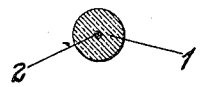

Fig. 2 is a further enlargement and is a cross sectional view on the line 2—2 of Fig. 1.

In the embodiment of the invention shown, the body 1 of the root canal point is composed of gutta-percha, paraffine or other appropriate substance having the characteristics of said materials. A small wire 2 is embedded longitudinally in the center of the body of the canal point, extending entirely or nearly to the pointed extremity. The wire is of silver, and is perfectly smooth throughout its length, as shown. The wire may be of the same diameter throughout its length or it may be tapered or pointed at the end that is embedded in the pointed extremity of the body of the canal point.

The body of the canal point may be of any desired size or length and, irrespective of such variations, the wire core gives a desired rigidity without interfering with the proper flexibility of the canal point.

From the foregoing it will be seen that my invention obtains numerous advantages and desirable results. The wire core, being embedded in the body of the canal point, prevents turning or bending back of the pointed end of the canal point when being inserted in a root canal, and it affords proper rigidity to the structure without interfering with the flexibility thereof.

I do not restrict myself to unessential particulars, but what I claim and desire to secure by Letters Patent is:—

A root canal point, composed of a tapering body of pliable material, and a small silver wire embedded centrally in said body and extending nearly to the end of the pointed extremity thereof and being perfectly smooth throughout its length to permit withdrawal of the wire from said body when both are in a root canal to leave the body in the canal.

GEORGE L. MILLER.